US008655332B2

(12) United States Patent
Yang (10) Patent No.: US 8,655,332 B2
(45) Date of Patent: Feb. 18, 2014

(54) METHOD AND SYSTEM FOR REALIZING ONE-NUMBER MULTIPLE-TERMINAL SERVICE

(75) Inventor: Jianjun Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 44 days.

(21) Appl. No.: 13/257,967

(22) PCT Filed: Oct. 22, 2009

(86) PCT No.: PCT/CN2009/074570
§ 371 (c)(1),
(2), (4) Date: Nov. 2, 2011

(87) PCT Pub. No.: WO2010/127532
PCT Pub. Date: Nov. 11, 2010

(65) Prior Publication Data
US 2012/0100836 A1  Apr. 26, 2012

(30) Foreign Application Priority Data
May 6, 2009  (CN) .......................... 2009 1 0083627

(51) Int. Cl.
*H04M 3/42*  (2006.01)

(52) U.S. Cl.
USPC ..................... 455/417; 455/432.1; 455/432.3; 455/433; 455/435.1; 379/211.01; 379/211.02; 379/211.03; 379/211.04

(58) Field of Classification Search
USPC ........ 455/414.1, 415–417, 435.1–435.3, 433, 455/432.1–432.3; 379/211.01–211.04, 379/212.01
See application file for complete search history.

(56) References Cited

U.S. PATENT DOCUMENTS 5,867,570 A * 2/1999 Bargout et al. .......... 379/221.13
7,542,768 B2   6/2009 Florkey et al.

(Continued)

FOREIGN PATENT DOCUMENTS

CN   101106823 A   1/2008
CN   101163340 A   4/2008
(Continued)

OTHER PUBLICATIONS

International Search Report in international application No. PCT/CN2009/074570, mailed on Feb. 25, 2010.

(Continued)

*Primary Examiner* — Wayne Cai
(74) *Attorney, Agent, or Firm* — Oppedahl Patent Law Firm LLC (57) ABSTRACT

The present invention provides a method for realizing a one-number multiple-terminal service, the method comprises the following steps: a calling terminal calls a called terminal in a first network; the first network triggers, when the called terminal is a one-number multiple-terminal service subscriber and the called number is a main number, the call service to an intelligent service platform; the intelligent service platform obtains, from the first network, a Temporary Local Directory Number (TLDN) of the called terminal corresponding to the main number, stores the TLDN and sends a service control indication to the first network; the first network routes the call to a Next Generation Network according to the service control indication from the platform; the next generation network triggers the call service to the platform; and the platform returns the TLDN of the called terminal corresponding to the main number and all other terminal numbers bound to the main number to the Next Generation Network to connect the called terminals. The present invention further provides a system for realizing a one-number multiple-terminal service. The method and system disclosed in the present invention realize the simultaneous ringing and ordinal ringing of multiple user terminals by using a mobile terminal number as a main number.

15 Claims, 3 Drawing Sheets

(56) References Cited

U.S. PATENT DOCUMENTS

| | | |
|---|---|---|
| 8,340,673 B2 * | 12/2012 | Lin et al. .................. 455/445 |
| 2007/0224997 A1 | 9/2007 | Florkey et al. |
| 2010/0062807 A1 * | 3/2010 | Yao ............................ 455/558 |
| 2010/0110992 A1 | 5/2010 | Hu et al. |

FOREIGN PATENT DOCUMENTS

| | | |
|---|---|---|
| CN | 101552969 A | 10/2009 |
| RU | 52547 U1 | 3/2006 |
| WO | 2009012674 A1 | 1/2009 |

OTHER PUBLICATIONS

English Translation of the Written Opinion of the International Search Authority in international application No. PCT/CN2009/074570, mailed on Feb. 25, 2010.

Supplementary European Search Report in European application No. 09844284.1, mailed on Aug. 5, 2013.

* cited by examiner

METHOD AND SYSTEM FOR REALIZING ONE-NUMBER MULTIPLE-TERMINAL SERVICE

TECHNICAL FIELD

The present invention relates to value-added services of communication networks, and more particularly to a method and system for realizing a one-number multiple-terminal service.

BACKGROUND

With the increasing development of communication technologies, communication networks have presented the cross-coexistent situation of multi-patterns and multi-stages, such as the coexistence of Code Division Multiple Access (CDMA) network, Global System for Mobile Communications (GSM) network and Next Generation Network (NGN) and the like. A user may possess communication terminals corresponding to different networks so as to use different networks. In this case, it is generally desired by the user that the multiple terminals are represented with a same number, a main number, so that all the terminals bound to the main number can be connected when another user dials the main number. This type of service is one-number multiple-terminal service, the specific service types are specifically divided into the simultaneous ringing and ordinal ringing of all the bound terminals. Wherein, the one-number multiple-terminal simultaneous ringing service means that when a calling terminal calls the main number of the called terminals, all the terminals bound to the main number ring simultaneously; and the one-number multiple-terminal ordinal ringing service means that when a calling terminal calls the main number of the called terminals, all the terminals bound to the main number ring in sequence according to a predetermined order. The one-number multiple-terminal service greatly improves user experience and promotes the communication efficiency between users, and therefore has a bright market prospect.

Currently, both mobile phones and fixed phones including PHS (Personal Handy-phone System) are supported by all the domestic operators. As mobile phones are the most popular and convenient communication tool currently and the numbers of mobile phones are stored by most users, a mobile phone number is the first choice of the main number in the one-number multiple-terminal service.

Limited by the Wireless Intelligent Network (WIN) protocol of CDMA network and the Customized Application for Mobile Network Enhanced Logic (CAMEL) protocol of GSM network, it is difficult for the one-number multiple-terminal service to realize the simultaneous ringing or ordinal ringing of three or more numbers. With the development of NGN, NGN has converged circuit-switched networks, Public Switched Telephone Network (PSTN), Public Land Mobile Network (PLMN) and the like, and IP packet-switched networks, therefore, the problem above can be solved. However, how to realize the one-number multiple-terminal service, by using a mobile terminal number as a main number, becomes another problem in this field that should be urgently solved.

SUMMARY

The main objective of the present invention is to provide a method and system for realizing a one-number multiple-terminal service, which can realize the simultaneous ringing and ordinal ringing of multiple user terminals by using a mobile terminal number as a main number.

In order to achieve the objective above, the technical solutions of the present invention are realized as follows.

The present invention provides a method for realizing a one-number multiple-terminal service, the method comprises the following steps:

A: a calling terminal calls a called terminal which is in a first network, and the first network sends, when the called terminal is a one-number multiple-terminal service subscriber and the called number is a main number, a call service triggering request to an intelligent service platform;

B: the intelligent service platform obtains from the first network a Temporary Local Directory Number (TLDN) of the called terminal corresponding to the main number, stores the TLDN and sends a service control indication to the first network;

C: the first network sends a call service triggering request to a Next Generation Network (NGN) to route the call to the NGN according to the service control indication sent by the intelligent service platform; and D: the NGN triggers the call service to the intelligent service platform according to the call service triggering request sent from the first network, and the intelligent service platform returns a service control indication, including the TLDN of the called terminal corresponding to the main number and all the other terminal numbers bound to the main number, to the NGN to connect the called terminals.

In the technical solution above, the step A may comprise the following steps:

A1: the calling terminal initiates a call to the called terminal in the first network, and the call arrives at a Mobile Switching Center (MSC) of the first network;

A2: the MSC sends a Send Routing Info (SRI) to a Home Location Register (HLR), and the HLR returns an SRI response message to the MSC; and A3: the MSC determines whether the called terminal is a one-number multiple-terminal service subscriber according to the subscription information contained in the SRI response message, and triggers, when the called terminal is a one-number multiple-terminal service subscriber and the called number is a main number, the service to the intelligent service platform, or the MSC directly connects the corresponding called terminal when the called terminal is not a one-number multiple-terminal service subscriber.

In the technical solution above, the step of sending a service control indication in the step B may comprise that:

when determining the called number to be the main number of the one-number multiple-terminal service according to the locally stored intelligent service data, the intelligent service platform inserts a prefix code before the called number, and then sends the called number inserted with the prefix code to the MSC of the first network.

In the technical solution above, the step of routing the call to the NGN in the step C may comprise: the first network routes the call to the Soft Switch (SS) of the NGN, wherein the called number is inserted with the prefix code.

In the technical solution above, the step D may comprise the following steps:

D1: after receiving the call routed by the MSC of the first network, the SS of the NGN triggers the call service to the intelligent service platform via a Session Initiation Protocol (SIP) according to the prefix code inserted before the called number;

D2: the intelligent service platform returns the service control indication, including the TLDN of the called terminal corresponding to the main number and all the other terminal numbers bound on the main number, to the SS of the NGN; and D3: the SS directly connects the called terminals in the NGN and synchronously routes the terminal numbers and the TLDN of the called terminal corresponding to the main number in the first network to the MSC of the first network, and the MSC connects the called terminals in the first network.

In the technical solution above, the first network may be a Code Division Multiple Access (CDMA) network or a Global System for Mobile Communications (GSM) network.

The present invention further provides a system for realizing a one-number multiple-terminal service, the system comprises a first network, a Next Generation Network (NGN) and an intelligent service platform, wherein the first network may be configured to send a call service triggering request to the intelligent service platform to trigger a call service to the intelligent service platform, and send a call routing request to the NGN according to a service control indication sent by the intelligent service platform; wherein the service control indication includes a called number inserted with a prefix code to route the call to the NGN;

the NGN may be configured to send the call service triggering request to the intelligent service platform according to the call routed from the first network to trigger the call service to the intelligent service platform, and connect the called terminals according to the service control indication sent by the intelligent service platform; wherein the service control indication includes the TLDN of the called terminal corresponding to the main number and all other terminal numbers bound to the main number; and the intelligent service platform may be configured to send a service control indication including the called number inserted with the prefix code to the first network and a service control indication including the TLDN of the called terminal corresponding to the main number and all other terminal numbers bound to the main number to the NGN respectively according to the call service triggering requests from the first network and the NGN network.

In the system, the first network may comprise a Mobile Switching Center (MSC) and a Home Location Register (HLR), wherein:

the MSC may be configured to send the SRI to the HLR as a call arriving, trigger the call service to the intelligent service platform according to the SRI response message returned by the HLR, send a call routing request to the NGN to route the call to the NGN according to the service control indication sent by the intelligent service platform, and receive the terminal numbers and the TLDN of the called terminal corresponding to the main number from the intelligent service platform routed back by the NGN to connect the called terminals; and the HLR may be configured to return an SRI response message to the MSC according to the SRI sent by the MSC.

In the system, the NGN may comprise a soft switch (SS), the SS is configured to send a call service triggering request to the intelligent service platform according to a call routing request of the first network, trigger the call service to the intelligent service platform, connect the called terminals according to a service control indication sent by the intelligent service platform, and route the terminal numbers in the first network and the TLDN of the called terminal corresponding to the main number returned by the intelligent service platform to the first network.

In the system, the first network may be a Code Division Multiple Access (CDMA) network or a Global System for Mobile Communications (GSM) network.

The present invention provides a first network supportive to a one-number multiple-terminal service, wherein the first network may be configured to:

receive a call sent by a calling terminal to a called terminal in the first network, send a call service triggering request to an intelligent service platform supportive to the one-number multiple-terminal service after determining the called terminal to be a one-number multiple-terminal service subscriber and the called number to be a main number, so as to trigger the call service to the intelligent service platform, and send a call routing request to a NGN supportive to the one-number multiple-terminal service according to a service control indication sent by the intelligent service platform; wherein the service control indication includes the called number inserted with a prefix code to route the call to the NGN.

The first network may be further configured to receive the terminal numbers and the TLDN of the called terminal corresponding to the main number from the intelligent service platform routed back by the NGN, and connect the called terminals.

The first network may comprise a Mobile Switching Center (MSC) and a Home Location Register (HLR), wherein the MSC may be configured to send the SRI to the HLR as a call arrives, and send a call service triggering request to the intelligent service platform according to the SRI response message returned by the HLR to trigger a call service to the intelligent service platform, send a call routing request to the NGN according to the service control indication sent by the intelligent service platform, route the call to the NGN, and receive the terminal numbers and the TLDN of the called terminal corresponding to the main number from the intelligent service platform routed back by the NGN to connect the called terminals; and the HLR may be configured to return the SRI response message to the MSC according to the SRI sent by the MSC.

The first network may be a Code Division Multiple Access (CDMA) network or a Global System for Mobile Communications (GSM) network.

The present invention further provides a Next Generation Network (NGN) supportive to a one-number multiple-terminal service, wherein the NGN may be configured to:

receive a call routing request sent by a first network supportive to a one-number multiple-terminal service, send a call service triggering request to an intelligent service platform supportive to a one-number multiple-terminal service according to the call routed by the first network to trigger the call service to the intelligent service platform, and connect the called terminals according to a service control indication sent by the intelligent service platform; wherein the service control indication includes the TLDN of the called terminal corresponding to the main number and all other terminal numbers bound to the main number.

The NGN may be further configured to:

route the terminal numbers and the TLDN of the called terminal corresponding to the main number in the first network returned by the intelligent service platform to the first network.

The NGN may comprise a Soft Switch (SS), the SS is configured to send a call service triggering request to the intelligent service platform according to the call routing request of the first network, trigger the call service to the intelligent service platform, connect the called terminals according to the service control indication sent by the intelligent service platform including the TLDN of the called terminal corresponding to the main number and all the other terminal numbers bound to the main number, and route the terminal numbers and the TLDN of the called terminal corresponding to the main number in the first network returned by the intelligent service platform to the first network.

The present invention further provides an intelligent service platform supportive to a one-number multiple-terminal service, wherein the intelligent service platform may be configured to:

send a service control indication to a first network supportive to a one-number multiple-terminal service according to a call service triggering request from the first network, wherein the service control indication includes a called number inserted with a prefix code; and send a service control indication to an NGN supportive to a one-number multiple-terminal service according to a call service triggering request from the NGN network, wherein the service control indication includes the TLDN of a called terminal corresponding to the main number and all other terminal numbers bound to the main number.

In the method and system for realizing a one-number multiple-terminal service, the first network triggers a call service to the intelligent service platform when the called terminal is a one-number multiple-terminal service subscriber and the called number is a main number, and routes the call to the NGN according to a service control indication sent by the intelligent service platform, and then the NGN realizes the simultaneous ringing and ordinal ringing of all the terminals bound to the main number, therefore, the present invention brings much convenience to users, enhances user experience, and improves the efficiency of the communication between users.

DETAILED DESCRIPTION

The basic idea of the present invention is that: a first network triggers a call service to an intelligent service platform when the called terminal is a one-number multiple-terminal service subscriber and the called number is a main number, and routes the call to a NGN according to a service control indication sent by the intelligent service platform to realize the simultaneous ringing or ordinal ringing of all the terminals bound to the main number, thus brings great convenience to the terminal user.

In the present invention, the services that can be realized by the intelligent service platform include, but not limited, narrowband guided service and broadband one-number multiple-terminal service and the like.

Figure 1:
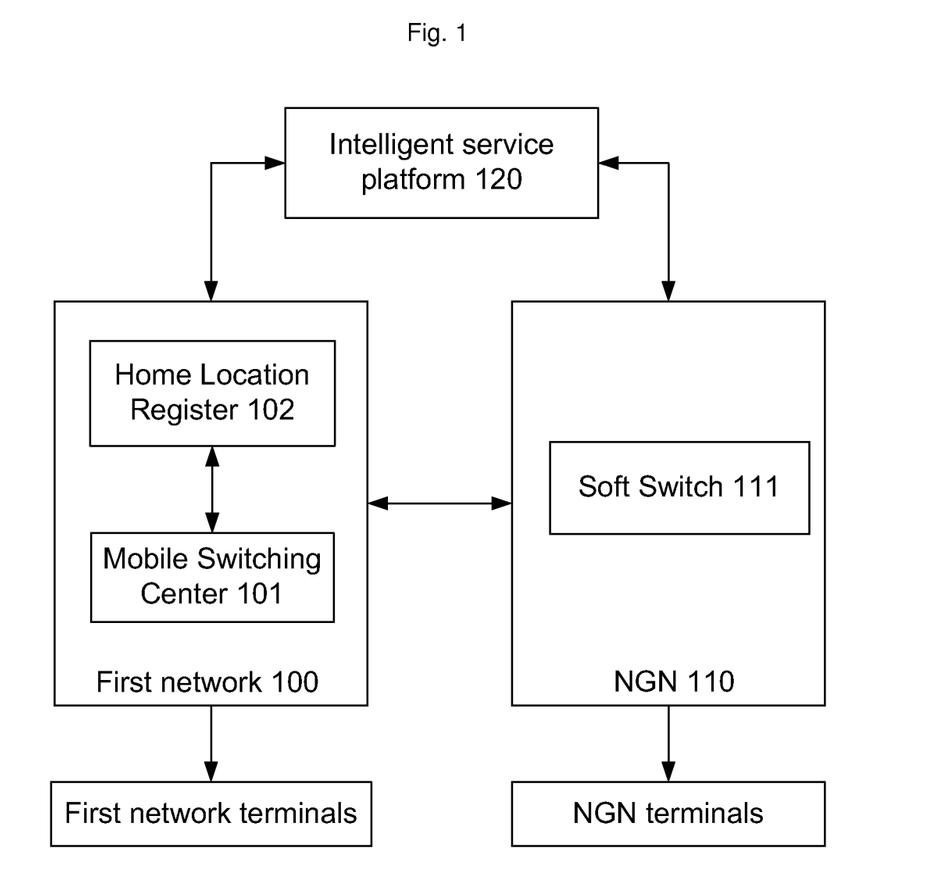
FIG. 1 is a block diagram illustrating a system for realizing a one-number multiple-terminal service of the present invention.

FIG. 1 is a block diagram illustrating a system for realizing a one-number multiple-terminal service of the present invention. As shown in FIG. 1, the system of the present invention comprises a first network 100, a NGN 110 and an intelligent service platform 120.

The first network 100 is arranged to send a call service triggering request to the intelligent service platform 120 to trigger a call service to the intelligent service platform 120, and send a call routing request to the NGN 110 according to a service control indication sent by the intelligent service platform 120 to route the call to the NGN 110.

The NGN 110 is arranged to send a call service triggering request to the intelligent service platform 120 according to the call routed from the first network 100 to trigger a call service to the intelligent service platform 120, and connect called terminals according to a service control indication sent by the intelligent service platform 120.

The intelligent service platform 120 is arranged to send the service control indications to the first network 100 and the NGN 110 respectively according to the call service triggering requests from the first network 100 and the NGN 110.

The first network 100 comprises a Mobile Switching Center (MSC) 101 and a Home Location Register (HLR) 102.

The MSC 101 is arranged to send Send Routing Info (SRI) to the HLR 102 as a call arrives, send a call service triggering request to the intelligent service platform 120 according to an SIR response message (SRI_ack) returned by the HLR 102 to trigger the call service to the intelligent service platform 120, and then send a call routing request to the NGN 110 according to a service control indication sent by the intelligent service platform 120 to route the call to the NGN 110.

The HLR 102 is arranged to return the SRI response message to the MSC 101 according to the SRI sent by the MSC 101.

The intelligent service platform 120 is further arranged to obtaining, from the HLR 102 of the first network 100, and storing a Temporary Local Directory Number (TLDN) of the called terminal corresponding to the main number.

In the technical solution above, the MSC 101 determines whether the called terminal is a one-number multiple-terminal service subscriber according to the subscription information in the SRI_ack returned by the HLR 102, and sends, when the called terminal is a one-number multiple-terminal service subscriber and the called number is a main number, a call service triggering request to the intelligent service platform 120 to trigger the call service to the intelligent service platform 120; or the MSC 101 directly connects a corresponding called terminal when the called terminal is not a one-number multiple-terminal service subscriber.

The NGN 110 further comprises a Soft Switch (SS) 111. The SS 111 is arranged to send a call service triggering request to the intelligent service platform 120 according to a call routing request from the first network 100 to trigger a call service to the intelligent service platform 120, and connect called terminals according to a service control indication sent by the intelligent service platform 120.

The service control indication comprises the TLDN of the called terminal corresponding to the main number and all the other terminal numbers bound to the main number.

The SS directly connects the called terminals in the NGN 110, and synchronously routes the terminal numbers in the first network 100 and the TLDN of the called terminal corresponding to the main number back to the MSC 101 of the first network 100, and then the MSC connects the corresponding called terminals.

Here, the reason for routing the TLDN of the called terminal corresponding to the main number back to the MSC 101 of the first network 100 is that a call service will be triggered to the intelligent service platform 120 again when the number of the called terminal, i.e., the main number is routed back to the MSC 101.

In the present invention, the called terminals refer to terminals in the first network and the NGN, and the first network 100 is a CDMA network or a GSM network.

Figure 2:
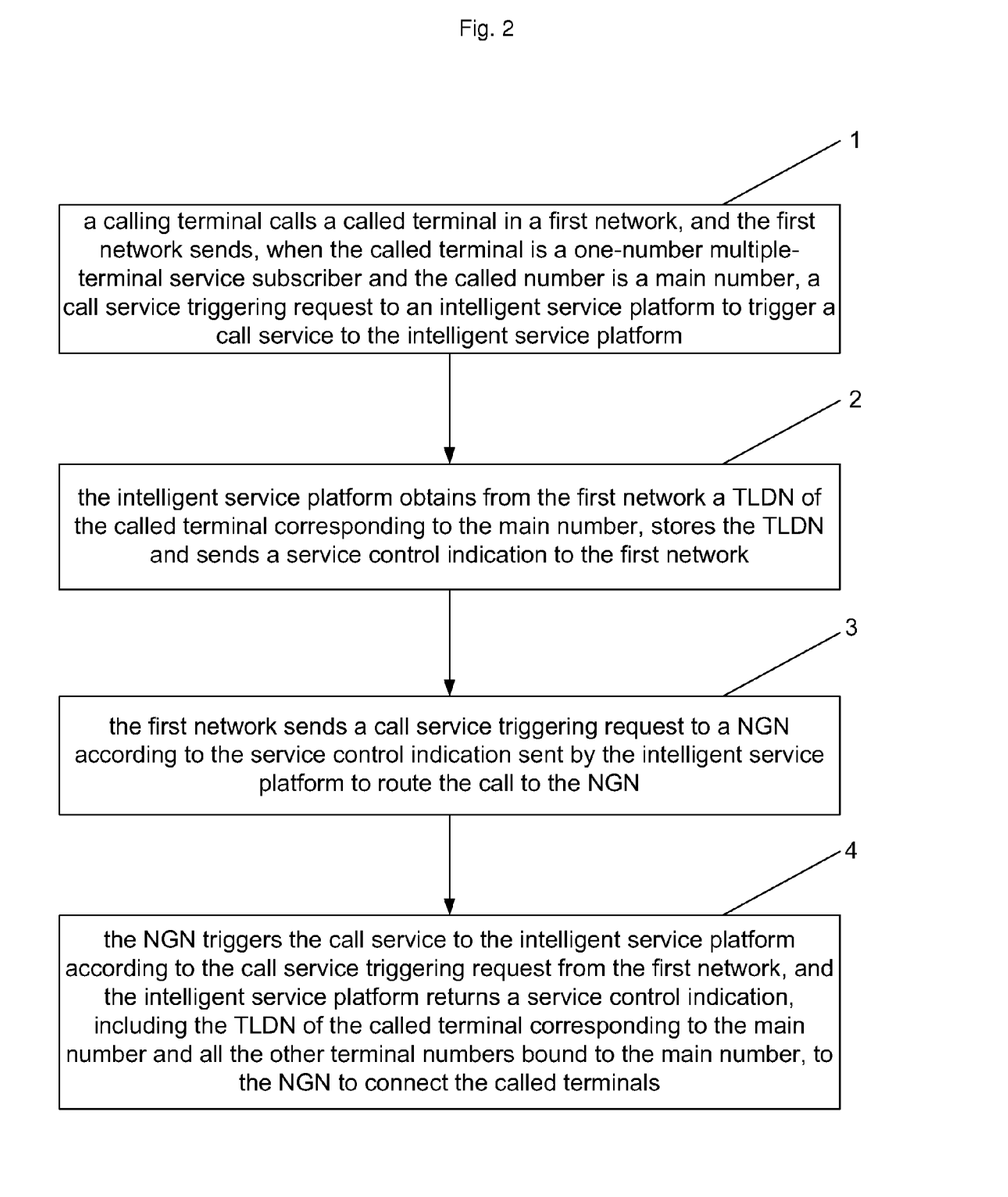
FIG. 2 is a flow-chart illustrating a method for realizing a one-number multiple-terminal service of the present invention.

FIG. 2 is a flow-chart illustrating a method for realizing a one-number multiple-terminal service of the present invention. As shown in FIG. 2, the method of the present invention comprises the following steps that:

step 1: a calling terminal calls a called terminal in a first network, and the first network sends, when the called terminal is a one-number multiple-terminal service subscriber and the called number is a main number, a call service triggering request to an intelligent service platform to trigger a call service to the intelligent service platform;

step 2: the intelligent service platform obtains from the first network a TLDN of the called terminal corresponding to the main number, stores the TLDN and sends a service control indication to the first network;

step 3: the first network sends a call service triggering request to a NGN according to the service control indication sent by the intelligent service platform to route the call to the NGN; and step 4: the NGN triggers the call service to the intelligent service platform according to the call service triggering request from the first network, and the intelligent service platform returns a service control indication, including the TLDN of the called terminal corresponding to the main number and all the other terminal numbers bound to the main number, to the NGN to connect the called terminals.

Specifically, step 1 comprises the following steps:

step 1a: the calling terminal calls the called terminal which is in the first network, and the call arrives at the MSC of the first network;

step 1b: the MSC sends an SRI to the HLR, and the HLR returns an SRI_ack to the MSC; and step 1c: the MSC determines whether the called terminal is a one-number multiple-terminal service subscriber according to the subscription information contained in the SRI_ack returned by the HLR, and triggers, when the called terminal is a one-number multiple-terminal service subscriber and the called number is a main number, the call service to the intelligent service platform; or the MSC directly connects the corresponding called terminal when the called terminal is not a one-number multiple-terminal service subscriber.

In step 1, the MSC triggers the call service to the intelligent service platform by sending an Initial Detection Point (IDP) message to the intelligent service platform.

Specifically, Step 2 comprises the following steps:

step 2a: the intelligent service platform obtains, from the HLR of the first network, a TLDN of the called terminal corresponding to the main number, and stores the TLDN; and step 2b: after determining the called number to be the main number of the is one-number multiple-terminal service according to the locally stored intelligent service data, the intelligent service platform inserts a prefix code before the called number, and then sends the called number with the prefix code to the MSC of the first network.

Here, the prefix code is predetermined by the system, and the MSC of the first network determines whether to route the call to the NGN according to whether the prefix code is contained in the called number returned from the intelligent service platform.

In step 3, the MSC of the first network routes the call to the SS of the NGN after receiving the called number inserted with the prefix code sent from the intelligent service platform.

Specifically, step 4 comprises the following steps:

step 4a: after receiving the call routed by the MSC of the first network, the SS of the NGN triggers the call service to the intelligent service platform via a Session Initiation Protocol (SIP) according to the prefix code inserted before the called number;

step 4b: the intelligent service platform returns a service control indication, including the TLDN of the called terminal corresponding to the main number and all the other terminal numbers bound to the main number, to the SS of the NGN; and step 4c: the SS directly connects the called terminals in the NGN and synchronously routes the terminal numbers in the first network and the TLDN of the called terminal corresponding to the main number back to the MSC of the first network, and the MSC connects the called terminal in the first network.

The method for realizing a one-number multiple-terminal service is further illustrated below by reference to a specific embodiment in conjunction with drawings.

In this embodiment, the first network is a CDMA network, and a mobile terminal number in the CDMA network is a main number.

Figure 3:
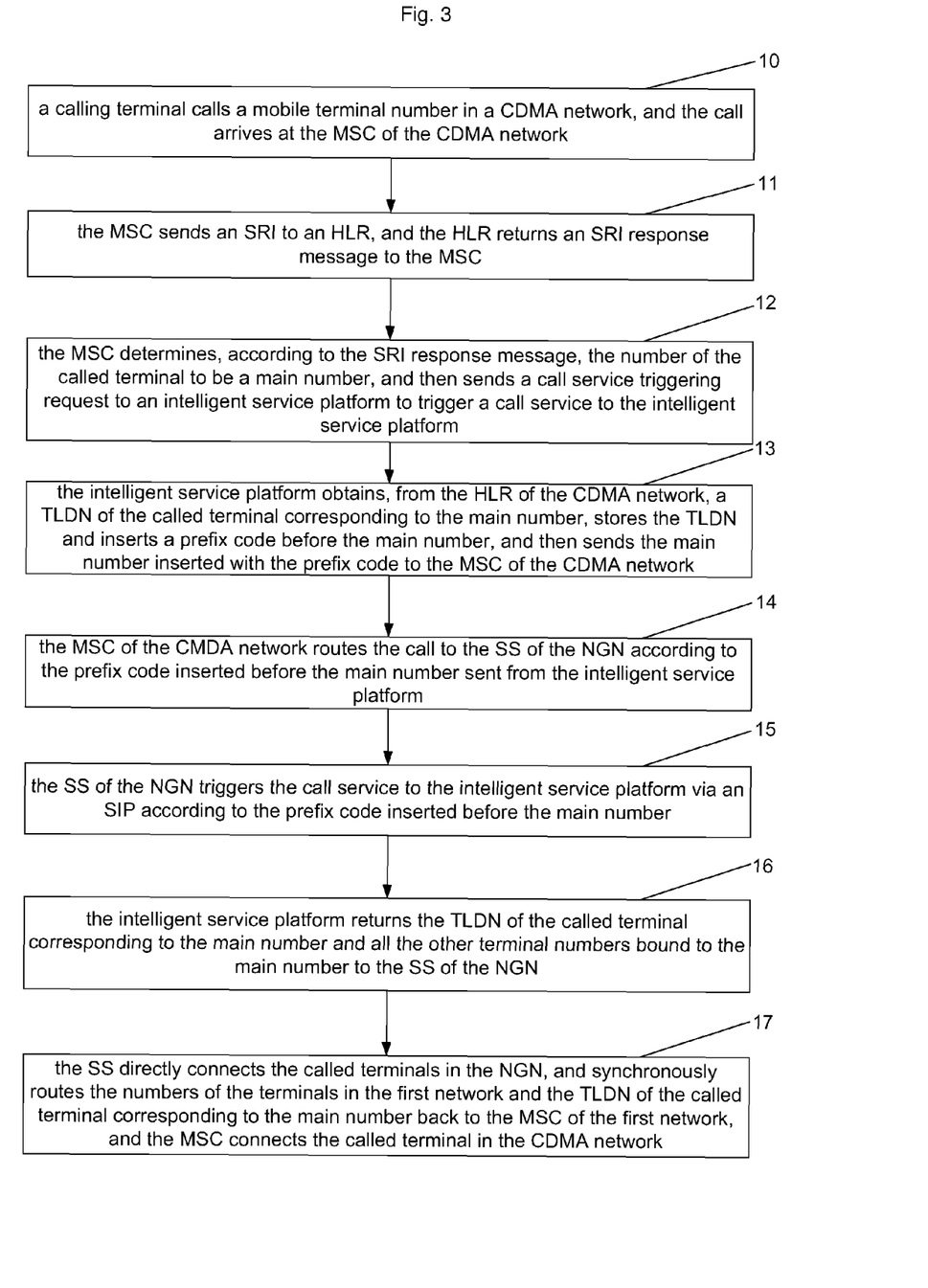
FIG. 3 is a flow-chart illustrating one embodiment of a method for realizing a one-number multiple-terminal service.

FIG. 3 is a flow-chart illustrating one embodiment of a method for realizing a one-number multiple-terminal service. As shown in FIG. 3, the method comprises the following steps:

step 10: a calling terminal calls a mobile terminal in a CDMA network, and the call arrives at the MSC of the CDMA network;

step 11: the MSC sends an SRI to an HLR, and the HLR returns an SRI response message to the MSC;

step 12: the MSC determines, according to the SRI response message, the number of the called terminal to be a main number, and then sends a call service triggering request to an intelligent service platform to trigger a call service to the intelligent service platform;

step 13: the intelligent service platform obtains, from the HLR of the CDMA network, a TLDN of the called terminal corresponding to the main number, stores the TLDN and inserts a prefix code before the main number, and then sends the main number inserted with the prefix code to the MSC of the CDMA network;

step 14: the MSC of the CMDA network routes the call to the SS of the NGN according to the prefix code inserted before the main number sent from the intelligent service platform;

step 15: the SS of the NGN triggers the call service to the intelligent service platform via an SIP according to the prefix code inserted before the main number;

step 16: the intelligent service platform returns the TLDN of the called terminal corresponding to the main number and all the other terminal numbers bound to the main number to the SS of the NGN; and step 17: the SS directly connects the called terminals in the NGN, and synchronously routes the numbers of the terminals in the first network and the TLDN of the called terminal corresponding to the main number back to the MSC of the first network, and the MSC connects the called terminal in the CDMA network.

In conclusion, by the use of the NGN, the present invention realizes the simultaneous ringing and ordinal ringing of all the bound terminals by using a mobile terminal number as a main number, and therefore brings much convenience to users.

The mentioned above are only preferred embodiments of the present invention but not limitation to the protection scope of the present invention.

INDUSTRIAL APPLICABILITY

In the method and system for realizing a one-number multiple-terminal service, the first network triggers a call service to the intelligent service platform when the called terminal is a one-number multiple-terminal service subscriber and the called number is a main number, and routes the call to the NGN according to a service control indication sent by the intelligent service platform, and then the simultaneous ringing and ordinal ringing of all the terminals bound to the main number is realized by the NGN, therefore, the present invention brings much convenience to users, enhances user experience further, and improves the efficiency of the communication between users.

What is claimed is:

1. A method for realizing a one-number multiple-terminal service, comprising:
    A: calling a called terminal in a first network by a calling terminal, and when the called terminal is a one-number multiple-terminal service subscriber and the called number is a main number, sending a call service triggering request to an intelligent service platform by the first network;
    B: obtaining from the first network a Temporary Local Directory Number (TLDN) of the called terminal corresponding to the main number, storing the TLDN and sending a service control indication to the first network by the intelligent service platform;
    C: sending a call service triggering request to a Next Generation Network (NGN) by the first network to route the call to the NGN according to the service control indication sent by the intelligent service platform; and
    D: triggering the call service to the intelligent service platform by the NGN according to the call service triggering request sent from the first network, and returning by the intelligent service platform a service control indication, including the TLDN of the called terminal corresponding to the main number and all other terminal numbers bound to the main number, to the NGN to connect the called terminals.

2. The method according to claim 1, wherein the step A comprises:
    A1: the calling terminal initiating a call to the called terminal in the first network, and the call arriving at a Mobile Switching Center (MSC) of the first network;
    A2: the MSC sending a Send Routing Info (SRI) to a Home Location Register (HLR), and the HLR returning an SRI response message to the MSC; and
    A3: the MSC determining whether the called terminal is a one-number multiple-terminal service subscriber according to the subscription information contained in the SRI response message, and triggering, when the called terminal is a one-number multiple-terminal service subscriber and the called number is a main number, the service to the intelligent service platform, or the MSC directly connecting the corresponding called terminal when the called terminal is not a one-number multiple-terminal service subscriber.

3. The method according to claim 2, wherein the step of sending a service control indication in the step B comprises:
    when determining the called number to be the main number of the one-number multiple-terminal service according to the locally stored intelligent service data, the intelligent service platform inserting a prefix code before the called number, and then sending the called number inserted with the prefix code to the MSC of the first network.

4. The method according to claim 3, wherein the step of routing the call to the NGN in the step C comprises:
    the first network routing the call to the Soft Switch (SS) of the NGN, wherein the called number is inserted with the prefix code.

5. The method according to claim 4, wherein the step D comprises:
    D1: after receiving the call routed by the MSC of the first network, the SS of the NGN triggering the call service to the intelligent service platform via a Session Initiation Protocol according to the prefix code inserted before the called number;
    D2: the intelligent service platform returning a service control indication, including the TLDN of the called terminal corresponding to the main number and all the other terminal numbers bound on the main number, to the SS of the NGN; and
    D3: the SS directly connecting the called terminals in the NGN and synchronously routing the terminal numbers and the TLDN of the called terminal corresponding to the main number in the first network to the MSC of the first network, and the MSC connecting the called terminals in the first network.

6. The method according to claim 5, wherein the first network is a Code Division Multiple Access (CDMA) network or a Global System for Mobile Communications (GSM) network.

7. A system for realizing a one-number multiple-terminal service, comprising a first network supportive to the one-number multiple-terminal service, an NGN supportive to the one-number multiple-terminal service, and an intelligent service platform supportive to the one-number multiple-terminal service;
    the first network being configured to:
    receive a call sent by a calling terminal to a called terminal in the first network, send a call service triggering request to an intelligent service platform supportive to the one-number multiple-terminal service after determining the called terminal to be a one-number multiple-terminal service subscriber and the called number to be a main number, so as to trigger the call service to the intelligent service platform, and send a call routing request to a NGN supportive to the one-number multiple-terminal service according to a service control indication sent by the intelligent service platform; wherein the service control indication includes the called number inserted with a prefix code to route the call to the NGN;
    the NGN being configured to:
    receive a call routing request sent by a first network supportive to a one-number multiple-terminal service, send a call service triggering request to an intelligent service platform supportive to a one-number multiple-terminal service according to the call routed by the first network to trigger the call service to the intelligent service platform, and connect called terminals according to the service control indication sent by the intelligent service platform; wherein the service control indication includes the TLDN of the called terminal corresponding to the main number and all other terminal numbers bound to the main number; and
    the intelligent service platform being configured to:
    send a service control indication to a first network supportive to a one-number multiple-terminal service according to a call service triggering request from the first network, wherein the service control indication includes a called number inserted with a prefix code; and
    send a service control indication to an NGN supportive to a one-number multiple-terminal service according to a call service triggering request from the NGN network, wherein the service control indication includes the TLDN of a called terminal corresponding to a main number and all other terminal numbers bound to the main number.

8. The system according to claim 7, wherein the first network is further configured to:

receive the terminal numbers and the TLDN of the called terminal corresponding to the main number from the intelligent service platform routed back by the NGN, and connect the called terminals.

9. The system according to claim 8, wherein the first network comprises a Mobile Switching Center (MSC) and a Home Location Register (HLR);

the MSC is configured to send Send Routing Info (SRI) to the HLR as a call arrives, and send a call service triggering request to the intelligent service platform according to the SRI response message returned by the HLR to trigger the call service to the intelligent service platform, and then send a call routing request to the NGN according to the service control indication sent by the intelligent service platform to route the call to the NGN, and receive the terminal numbers and the TLDN of the called terminal corresponding to the main number from the intelligent service platform routed back by the NGN to connect the called terminals; and the HLR is configured to return an SRI response message to the MSC according to the SRI sent by the MSC.

10. The system according to claim 9, wherein the NGN is further configured to:

route the terminal numbers in the first network and the TLDN, returned by the intelligent service platform, of the called terminal corresponding to the main number to the first network.

11. The system according to claim 9, wherein the NGN comprises a Soft Switch (SS) configured to:

send a call service triggering request to the intelligent service platform, according to the call routing request of the first network, to trigger the call service to the intelligent service platform;

connect the called terminals according to a service control indication sent by the intelligent service platform, wherein the service control indication includes the TLDN of the called terminal corresponding to the main number and all the other terminal numbers bound to the main number; and route the terminal numbers in the first network and the TLDN of the called terminal corresponding to the main number returned by the intelligent service platform to the first network.

12. The system according to claim 8, wherein the NGN is further configured to:

route the terminal numbers in the first network and the TLDN, returned by the intelligent service platform, of the called terminal corresponding to the main number to the first network.

13. The system according to claim 8, wherein the NGN comprises a Soft Switch (SS) configured to:

send a call service triggering request to the intelligent service platform, according to the call routing request of the first network, to trigger the call service to the intelligent service platform;

connect the called terminals according to a service control indication sent by the intelligent service platform, wherein the service control indication includes the TLDN of the called terminal corresponding to the main number and all the other terminal numbers bound to the main number; and route the terminal numbers in the first network and the TLDN of the called terminal corresponding to the main number returned by the intelligent service platform to the first network.

14. The system according to claim 7, wherein the NGN is further configured to:

route the terminal numbers in the first network and the TLDN, returned by the intelligent service platform, of the called terminal corresponding to the main number to the first network.

15. The system according to claim 7, wherein the NGN comprises a Soft Switch (SS) configured to:

send a call service triggering request to the intelligent service platform, according to the call routing request of the first network, to trigger the call service to the intelligent service platform;

connect the called terminals according to a service control indication sent by the intelligent service platform, wherein the service control indication includes the TLDN of the called terminal corresponding to the main number and all the other terminal numbers bound to the main number; and route the terminal numbers in the first network and the TLDN of the called terminal corresponding to the main number returned by the intelligent service platform to the first network.

* * * * *